Aug. 22, 1933.   I. E. McCABE   1,923,680
TEMPERATURE ACTUATED ELECTRIC CIRCUIT CONTROL
Filed April 24, 1926   3 Sheets-Sheet 1

INVENTOR.
IRA. E. McCABE.
BY *Langdon Moore*
ATTORNEYS.

Aug. 22, 1933.　　　I. E. McCABE　　　1,923,680

TEMPERATURE ACTUATED ELECTRIC CIRCUIT CONTROL

Filed April 24, 1926　　　3 Sheets-Sheet 2

INVENTOR.
IRA E. McCABE
BY *Langdon Moore*
ATTORNEYS.

Aug. 22, 1933.                I. E. McCABE                1,923,680
              TEMPERATURE ACTUATED ELECTRIC CIRCUIT CONTROL
                    Filed April 24, 1926        3 Sheets-Sheet 3
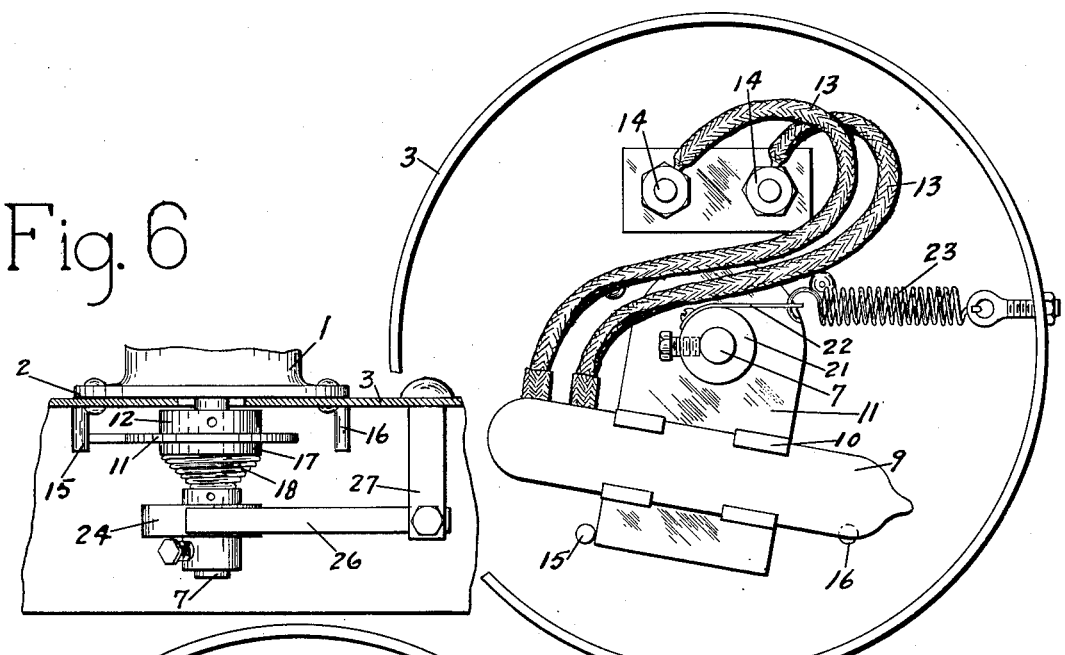
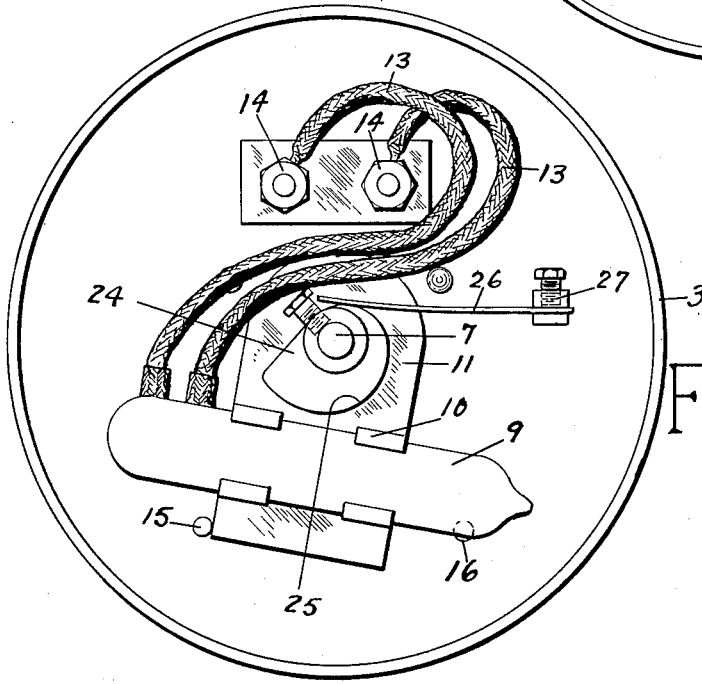
INVENTOR.
IRA E. McCABE
BY Langdon Moon
ATTORNEYS.

Patented Aug. 22, 1933

1,923,680

UNITED STATES PATENT OFFICE 1,923,680

TEMPERATURE ACTUATED ELECTRIC CIRCUIT CONTROL

Ira E. McCabe, Chicago, Ill.

Application April 24, 1926. Serial No. 104,392

4 Claims. (Cl. 200—138)

This invention relates to improvements in temperature-actuated electric circuit controls.

It is an object of this invention to produce a device of this character which requires no adjusting after it leaves the factory and is provided with a means whereby it is adapted for use in temperatures of varying intensity and will compensate for the increased fluctuations of operating temperatures of higher degrees so that the control will always operate to function properly irrespective of the working temperature of which it is subjected.

While the embodiment of this invention is illustrated in the form of a so-called stack control it is capable of many other uses; for the purpose of describing the construction and operation of this device it is illustrated and hereinafter described as applied for the purposes of controlling an electric circuit in connection with an electrically operated fuel burning device in which the control is actuated by the temperature of the stack or flue leading from the combustion chamber of a furnace, boiler or heater to the smoke stack or chimney. The intensity of the heat produced varies in accordance with the use to which it is applied, for instance, the intensity of the heat required in a domestic heating plant would be by no means as great as the intensity of the heat necessary for industrial purposes. In all instances, there is an economical operating temperature. The operating temperature required for domestic heating plant being considerably less than the operating temperature for an industrial heating plant. In all instances, this economical operating temperature is an approximate temperature as it fluctuates, because it is practically impossible to produce a continuous mean uniform temperature and there are always fluctuations above and below the mean employed as the operating temperature. It is a recognized fact that as the degree of the operating temperature increases the amount of fluctuations on either side of the mean become greater. It is the main object of this invention to provide a temperature actuated electric circuit control which will always function in the same manner irrespective of the amount of fluctuations at different operating temperatures.

While the preferred form of this invention is illustrated upon the accompanying sheets of drawings, yet it is to be understood that minor detail changes may be made to apply this invention to other forms without departing from the scope thereof.

In the drawings:

Figure 4 is a similar view of a modified form of this device.

Figure 5 is a similar view of another form or modification of this device.

Figure 6 is a fragmentary top plan view of Figure 5, partly in section and with parts removed.

Figure 1:
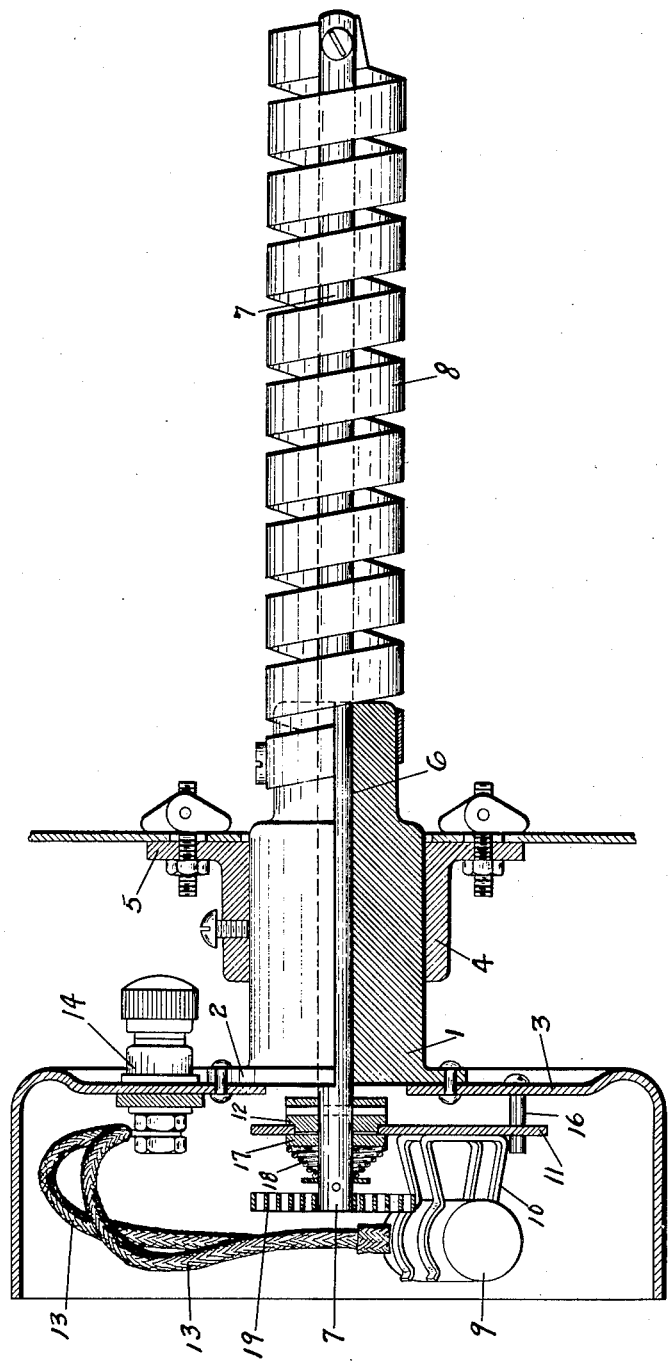
Figure 1 is a view in side elevation, partly in section, of a preferred form of this device as embodied in a stack control.

This device constructed as illustrated is adapted to be mounted upon the stack or pipe leading from the combustion chamber of a heater, which employs an electrically operated fuel burner, to the chimney or smoke stack and comprises a hub 1 having an outstanding flange 2 at one end adapted to act as a support for a concentric instrument casing 3. This hub is adapted to be received within a sleve 4, preferably secured thereto against movement by a set screw, which sleeve is provided with an outstanding flange 5 adapted to rest against the outer surface of the stack and be secured thereto by bolts or other desirable connections. This hub is provided with a central longitudinal bore 6 in which is loosely mounted an operating shaft 7 adapted to extend within the stack at one end and within the instrument casing at the other end. A portion of the hub extending within the stack is preferably reduced in diameter and that end of the operating shaft is preferably provided with a longitudinal groove or slot. A thermostatic element 8, preferably a by-metallic strip of helical or spiral formation, is arranged about the inner end of the shaft with one end secured in the groove or slot in the shaft and the other end to the reduced portion of the hub, preferably by screws. Upon increase in the temperature of the atmosphere or gasses within a stack, the thermal element will expand, causing a rotation of the shaft in one direction and a decrease in temperature within the stack will cause the thermal element to contract and cause the shaft to rotate in the opposite direction. The instrument casing provides a means of protection as well as connection for an electric switch 9 adapted to be operated by rotation of the thermal actuated operating shaft. The type of switch illustrated is preferably of the mercury tube type which comprises a sealed tube having terminals entering within and adjacent one end thereof and containing a sufficient amount of electric conducting fluid whereby when the tube is tilted in one direction the conductor will flow to the end containing the terminals and close an electric circuit therethrough and when tilted in the opposite direction will flow away from the electric terminals and break the circuit therethrough. This mercury tube is preferably carried by clips 10 mounted upon a plate 11 rotatively mounted adjacent one end upon a shouldered disk 12 firmly secured to the operating shaft 7 adjacent the hub 1, which disk rotates in unison with the shaft. Flexible leads 13 are attached to the respective terminals and to binding posts 14 mounted upon the rear wall of instrument casing adapted to place the terminals in the circuit to be controlled. The movement of the pivotally mounted switch supporting plate 11 is limited in both directions, preferably by engaging studs 15 and 16 carried upon the rear wall of the instrument casing. A frictional contact betwen the operating shaft and switch carrying plate is provided by mounting the plate to rotate about the cutout portion of the shoulder disk, the thickness of the plate being greater than the depth of the shoulder, and the surrounding portion of the plate held in frictional engagement with the enlarged portion of the disk by a washer or disk 17 loosely mounted upon the shaft 7 engaging the outer sides of the body of the plate 11 and held in engagement therewith by a coiled spring 18 resting upon the outer surface of the washer 17, and preferably held in compression there against by a washer or disk upon the shaft secured thereto by a pin. The tension of this coil spring being such that movement of the operating shaft in the other direction will cause the switch carrying plate to move therewith until engaged by the stop upon the instrument casing. Further movement of the operating shaft in the same direction will overcome the frictional contact between the switch carrying plate and the shaft, however, movement of the shaft in the opposite direction will immediately cause the switch carrying plate to be rotated in that direction until it engages the opposite stop.

By this construction it is readily seen that when this instrument is installed with the thermal element entering into the stack of the heater which is desired to be controlled by the electric circuit connected with the heat producing means, as soon as the fuel in the heater becomes ignited the temperature in the stack is increased causing the thermal element to expand which moves the switch carrying plate, through the rotation of the operating shaft and frictional connection, to engage one of the stops upon the instrument casing. This movement will cause the electric circuit to be made or broken through the mercury tube switch, depending upon the manner in which it is to be used and also upon the position in which the terminal end of the switch is inserted in the clips upon the switch carrying plate. Should the flame from the fuel become extinguished, the gases in the stack will cool, thereby reducing the temperature of the thermal element and cause the operating shaft to rotate in the opposite direction which will immediately impart an opposite movement to the mercury tube and switch until it engages the stop on the opposite side thereof.

Figure 2:
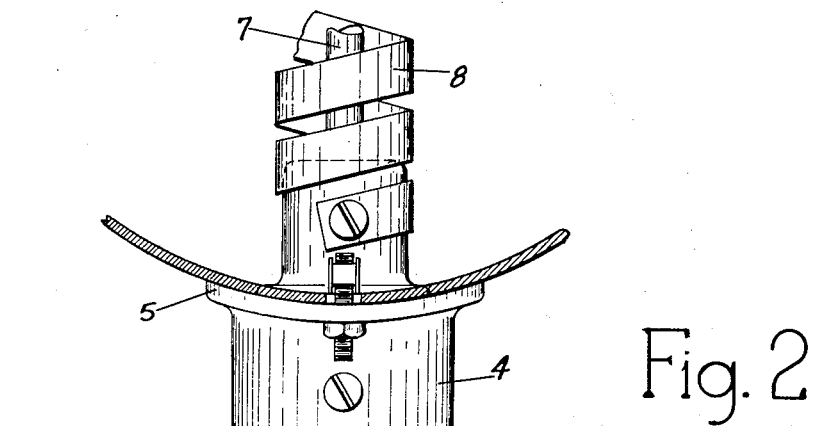
Figure 2 is a fragmentary top planned view, partly in section, of Figure 1.
Figure 3:
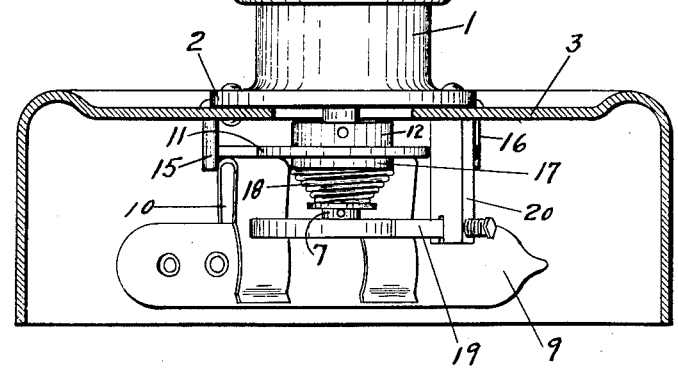
Figure 3 is a view in end elevation, with the casing cover removed, and looking into the casing.
Figure 3:
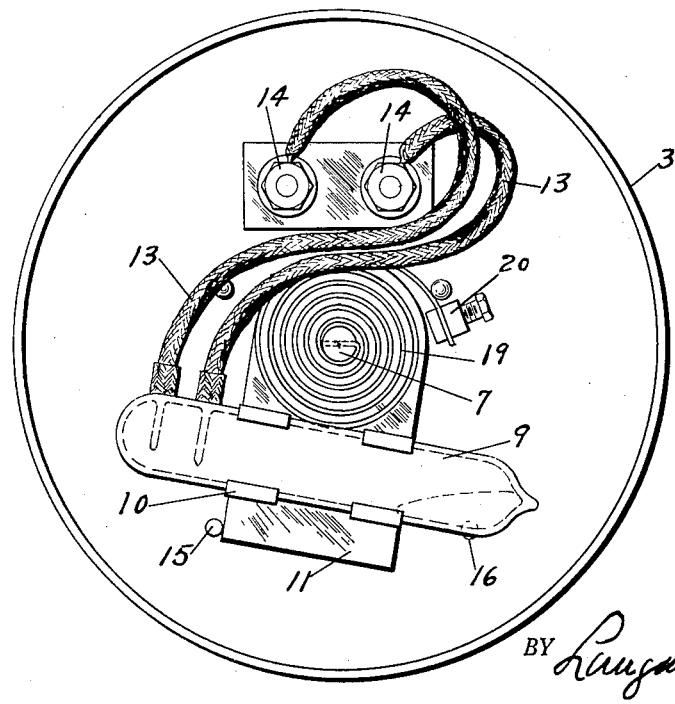

The frictional engagement between the operating shaft and switch carrying plate allows a further rotation of the shaft in the same direction after the movement of the switch-carrying plate has been engaged by its engagement with the stop, whereby the by-metallic thermal element is not deformed and will always expand and contract uniformly with an increase or decrease in temperature in the stack. A device of this character provided with the frictional slip connection between the operating shaft and switch carrying plate will operate satisfactorily at a relatively low economical operating temperature in which fluctuations on either side of the mean operating temperature are relatively small. However, the same construction will not operate satisfactorily in case the economical operating temperature is of considerably greater degree because in the higher degree of operating temperature the fluctuations above and below the mean operating temperature are considerably greater than those of a lower mean operating temperature and the thermal element having caused the operating shaft to actuate the switch in one direction the higher fluctuations will cause the shaft to rotate considerably further in the same direction than it would have at the lower mean operating temperature, whereupon the fluctuation of the higher operating temperature in the opposite direction would immediately cause the operating shaft to rotate the switch in the opposite direction, which with the greater fluctuations of higher mean operating temperature would cause a constant making and breaking of the circuit as the temperature fluctuated, which would not only be undesirable for the purposes of the control, but would also be very injurious to a switch of this type. In order to compensate for the increased fluctuations of the higher economical mean operating temperatures, a means is interposed between the operating shaft and switch carrying plate whereby the range of operation of the switch is increased as the economical mean operating temperature is increased, so that as the temperature increases within the stack after the expansion of the thermal element has caused the shaft through its frictional contact to operate the switch and through its frictional contact to allow further rotation of the shaft to snub the further rotation of the shaft beyond that point. While three forms of this means are illustrated upon the accompanying sheets of drawings, it is to be understood that the scope of this invention includes any other means which will accomplish the same purpose. In Figures 1, 2, and 3, a spiral coiled spring 19 is illustrated as being connected at one end to the end of the operating shaft 7 within the casing and the other end of the spring adjustably secured to a post 20 carried on the rear wall of the instrument casing, whereby as the shaft is caused to rotate by the expansion of the thermal element it will meet with increasing resistance to rotation in that direction and thereby greater temperatures cause proportionately less rotation of the shaft as the temperature increases.

Figure 4 illustrates another means comprising the securing of a disk 21 upon the end of the operating shaft within the casing, which disk is provided with a flexible tangented strap 22 secured to the circumference thereof by a screw, the free end of which strap is attached to a coiled spring 23, the other end of which spring is adjustably secured to the side wall of the casing 3, whereby increased opposition is interposed to continuous rotation of the shaft in a direction away from the spring.

Figures 5 and 6 illustrate another form for producing the same results which include a cam 24 secured to the inner end of the shaft 7 within the casing, the eccentric surface 25 of which is adapted to engage the free end of the leaf spring 26 held in contact therewith by being supported at its other end in a post 27 extending from the rear wall of the casing.

In the three forms illustrated, the tensions of the springs employed are adjusted to interpose opposition to the rotation of the operating shaft after the expansion of the thermal element has caused it, through its frictional contact, to throw the switch into the desired position and as the thermal element is subjected to a temperature higher than that degree will cause the shaft to meet constantly increasing opposition to further rotation in that direction. In other words, a fluctuation above the mean of a low economical operating temperature will cause a certain amount of rotation of the shaft whereby a drop back in temperature below the mean will throw the switch in the opposite direction and upon an increase to a much higher mean operating temperature, upon the much greater fluctuation above this higher mean will only cause approximately the same amount of movement of the shaft in that direction beyond the point or degree at which the switch carrying plate engaged to stop, so that a drop back from the higher fluctuation to below the higher mean operating temperature will throw the switch only when the higher mean has been reached.

It is therefore seen that a stack control temperature actuated electric circuit control constructed in accordance with this invention is a decided improvement over such a control provided only with the frictional slip, as first described, because a control constructed with this means for providing approximately the same amount of movement to the operating shaft beyond the point where it causes the switch carrying plate to engage the stop upon an increase of temperature, allows it to be employed in any type of heater irrespective of the economical operating temperature thereof and possesses the same advantages as the above described compensating means for preventing the deformation of the thermal element and at the same time prevents the chattering or rapid oscillation of the switch when a high degree of mean operating temperature is desirable.

What I claim is:

1. A temperature actuated electric circuit control including a switch, a coiled thermal element, a shaft secured to one end thereof and mounted to be rotated by the expansion and contraction of said element to operate the switch, means interposed between the switch and rotatable shaft allowing further rotation of the shaft after the switch has been operated, and additional means offering a yielding progressive resistance to further rotation of the shaft after it has rotated in one direction and operated the switch.

2. A temperature actuated electric circuit control including a switch, a coiled thermal element, a shaft secured to one end thereof and mounted to be rotated by the expansion and contraction of said element to operate the switch, means interposed between the switch and rotatable shaft allowing further rotation of the shaft after the switch has been operated by the expansion of the thermal element, and additional means engaging the shaft and exerting a progressive resistance to rotation thereof upon further expansion of said element.

3. A temperature actuated electric circuit control including a switch, a coiled thermal element, a shaft secured to one end thereof and mounted to be rotated by the expansion and contraction of said element to operate the switch, means interposed between the switch and rotatable shaft allowing further rotation of the shaft after the switch has been operated by the expansion of the thermal element, and means engaging the shaft and exerting a progressive resistance to rotation thereof upon further expansion of said element including a spring fixed at one end and in engagement with said shaft.

4. A temperature actuated electric circuit control including a switch, a coiled thermal element, a shaft secured to one end thereof and mounted to be rotated by the expansion and contraction of said element to operate the switch, means interposed between the switch and rotatable shaft allowing further rotation of the shaft after the switch has been operated by the expansion of the thermal element, and means engaging the shaft and exerting a progressive resistance to rotation thereof upon further expansion of said element including a cam upon said shaft and a spring fixed at one end bearing upon the cam surface.

IRA E. McCABE.